(12) United States Patent
Burke et al.

(10) Patent No.: US 12,500,307 B2
(45) Date of Patent: Dec. 16, 2025

(54) PORTABLE SECONDARY BATTERY

(71) Applicant: Bren-Tronics, Inc., Commack, NY (US)

(72) Inventors: Peter J. Burke, East Northport, NY (US); Daniel Sha, Huntington, NY (US); Richard Cecchini, Huntington, NY (US); Marek Roszko, Farmingdale, NY (US); Ryan Gaudreau, Commack, NY (US); Steven Chew, East Northport, NY (US)

(73) Assignee: Bren-Tronics, Inc., Commack, NY (US)

(*) Notice: Subject to any disclaimer, the term of this patent is extended or adjusted under 35 U.S.C. 154(b) by 531 days.

(21) Appl. No.: 17/876,874

(22) Filed: Jul. 29, 2022

(65) Prior Publication Data

US 2023/0029518 A1    Feb. 2, 2023

Related U.S. Application Data

(60) Provisional application No. 63/226,797, filed on Jul. 29, 2021.

(51) Int. Cl.
*H01M 50/136* (2021.01)
*H01M 50/103* (2021.01)
(Continued)

(52) U.S. Cl.
CPC ....... *H01M 50/244* (2021.01); *H01M 50/103* (2021.01); *H01M 50/121* (2021.01);
(Continued)

(58) Field of Classification Search
CPC ............. H01M 50/103; H01M 50/121; H01M 50/136; H01M 50/209; H01M 50/227;
(Continued)

(56) References Cited

U.S. PATENT DOCUMENTS 9,564,761 B2 * 2/2017 Hopfer, III .......... H01M 50/267
10,950,913 B1 * 3/2021 Goldin .............. H01M 10/0583
(Continued)

FOREIGN PATENT DOCUMENTS

| CN | 106784417 A | 5/2017 | |
| EP | 2333869 A1 * | 6/2011 | .......... H01M 10/052 |
| JP | 2008166208 A | 7/2008 | |

OTHER PUBLICATIONS

European Search Report corresponding to Application No. 22187834. 1-1108, dated Jan. 10, 2023.

*Primary Examiner* — Kevin E Yoon
(74) *Attorney, Agent, or Firm* — Hoffmann & Baron, LLP

(57) ABSTRACT

A flexible battery case with an insert mating to the tongue and groove joint to provide a stable platform for the controls, displays and peripheral connectors. Other connectors are disposed within a plastic housing and overmolded to create a waterproof seal. A charger is configured to execute a software program to confirm charger authorization to enable secondary battery charging and discharging. The control system is configured to monitor the integrity of a heating element and executes a software program to disable charging if the integrity of a heating element is compromised. A flexible substrate has a PCB on one side, and supports the individual battery cells and surface mount circuit boards on an opposite side. The flexible PCB substrate may be folded to sandwich an insulating layer therebetween.

19 Claims, 14 Drawing Sheets

(51) Int. Cl.
  *H01M 50/121* (2021.01)
  *H01M 50/227* (2021.01)
  *H01M 50/236* (2021.01)
  *H01M 50/24* (2021.01)
  *H01M 50/244* (2021.01)
  *H01M 50/258* (2021.01)

(52) U.S. Cl.
  CPC ....... *H01M 50/136* (2021.01); *H01M 50/227* (2021.01); *H01M 50/236* (2021.01); *H01M 50/24* (2021.01); *H01M 50/258* (2021.01)

(58) Field of Classification Search
  CPC . H01M 50/238; H01M 50/247; H01M 50/284
  See application file for complete search history.

(56) References Cited

U.S. PATENT DOCUMENTS

| | | | |
|---|---|---|---|
| 11,251,497 B1 * | 2/2022 | Goldin | H01M 50/207 |
| 2012/0073873 A1 | 3/2012 | Nash | |
| 2018/0366697 A1 * | 12/2018 | Elfering | H01M 50/516 |

* cited by examiner

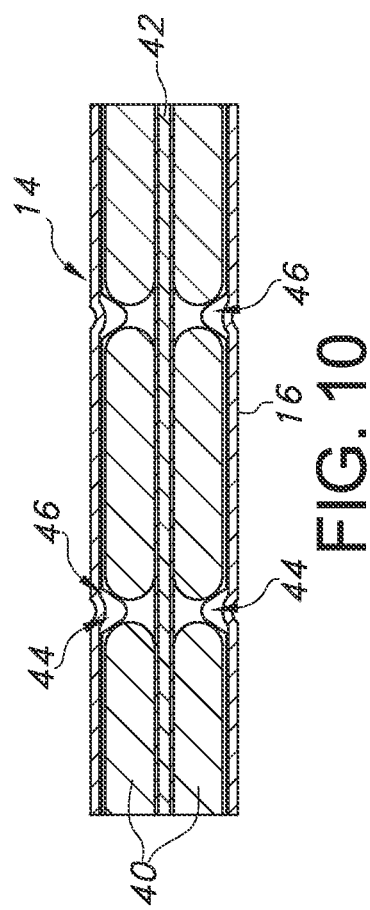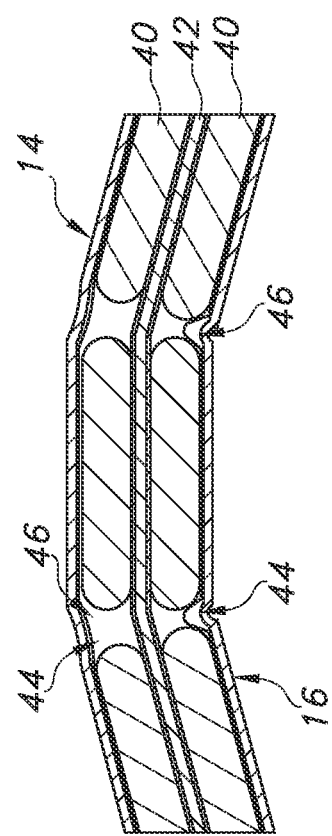

PORTABLE SECONDARY BATTERY

BACKGROUND

The invention relates to a portable secondary battery and more particularly to a high capacity, multiple cell battery system.

High capacity secondary batteries are formed by packing multiple rechargeable cells into a housing. The packing configuration can occupy a large volume, inadequately protect the cells from impact shock or lead to overheating. In addition, the battery requires sophisticated electronics to balance the charge between high and low voltage cells, protect the system from over-voltage conditions, efficiently convert power for output, provide suitable smart connectors, and provide battery status indicators.

Previously, lead acid batteries were used in high current applications or other situations requiring robust secondary batteries. These batteries are heavy and contain environmentally damaging compounds. Battery chemistry has been improved through the use of Lithium Ion (Li-Ion) cells. However, many small prismatic Li-Ion cells need to be bundled together to provide a battery with the required power capacity.

Accordingly, it would be desirable to provide a durable and flexible battery case for portability and field use.

In addition, it would be desirable to provide improved management of battery connections with increased safety, functionality and reliability for portability and field use.

SUMMARY

The present invention is directed to a housing for a secondary battery includes a flexible housing having an upper half and a lower half such that one half includes a tongue and the other half includes a groove extending around a periphery of the housing. The tongue and groove include at least one window provided along a joining line. A rigid insert includes a tongue on one half of a periphery of the insert and a groove on the other half of the periphery of the insert. The insert is configured to mount in the housing window, such that the tongue on the insert mounts in the groove of housing and the groove of the insert is configured to be co-extensive with the housing groove and adapted to receive the tongue on the housing.

The upper and lower half of the housing and at least one insert are secured together along the joining line. The rigid insert is adapted to mount controls, displays, electrical contacts and peripheral connectors thereon. The rigid insert may also include an elongated hexagonal shape such that elongated top and bottom sides are coupled to tapered v-shaped ends. The window in the housing is configured to receive the elongated hexagonal-shaped rigid insert.

The housing is preferably made by injection molding a thermoplastic elastomer and the housing may include an array of flat rectangular battery cells mounted on a flexible printed circuit board positioned within the housing. The housing further includes at least one externally accessible connector positioned in the housing. The connector is preferably mounted to a printed circuit board which includes a distal connection end. A back end of the connector and a portion of the printed circuit board are disposed in a plastic case. The case is encapsulated in an overmolded body to create a weatherproof sealed environment. The overmolded body is configured to extend over a portion of the distal connection end of the printed circuit board and includes a rigid insert having a tongue and groove which can be mounted in the housing tongue and groove window to maintain a weatherproof seal. At least one externally accessible connector may include a multi-pin DIN type connector, a NetWarrior connector and/or a USB connector. In order to make the secondary battery more user friendly, the flexible housing may include a friction reducing coating. The friction reducing coating may be parylene, plastiglide, fluorobond and/or a PTFE coating.

The present invention is also directed to an array of secondary batteries mounted within a flexible housing such that a planar array of spaced block-shaped cells are arranged in a plurality of rows and columns on a flexible printed circuit board. A first retention band may be secured to at least two cells across at least one row. The first retention band is provided with a slack portion between the cell rows. A second retention band may be secured to at least two cells across at least one column. The second retention band is provided with a slack portion between the cell columns. The flexible printed circuit board allows each row and column of cells to pivot relative to an adjacent row or column out of a substantially flat plane until the slack portion tightens to limit further movement of the cells. The retention band may be made from tape, reinforced tape, glass filament tape or a non-stretchable thermoplastic.

In one embodiment, a secondary battery is disclosed including an array of spaced-apart block-like cells arranged in a plurality of rows and columns on a flexible printed circuit board. The array of cells are preferably mounted within a flexible housing including externally accessible charging contacts. The charging contacts preferably include power and data contacts. A battery charger is configured to be removably connected to the power and data contacts to charge and/or discharge the array of cells. In operation, the battery charger is configured to query the data contacts and execute a software program to confirm charger authorization thereby enabling charging or discharging of the secondary battery through the power contacts. If the battery charger is disconnected from the data contacts, the battery disables the discharging function. The battery charger and secondary battery preferably include hardware and software, such that the charger executes a software program to confirm hardware compatibility to enable charging and/or discharging the secondary battery through the power contacts.

The secondary battery may also include an array of spaced apart block-like cells arranged in a plurality of rows and columns on a flexible printed circuit board. The array of cells are mounted within a flexible housing. The flexible printed circuit board preferably includes a heating element coupled thereto, the heating element being configured to heat the array of cells to enhance charging at low temperatures. The heating element may be in the form of a resistance wire or trace. The secondary battery further includes a controller having hardware and software configured to monitor the integrity of the heating element and execute a software program to disable charging and indicate the battery is in an unusable condition if the heating element exhibits a change in electrical characteristics. The change in electrical characteristics may be a change in continuity, resistance and/or impedance. Additionally, the heating element is configured as a plurality of serpentine heating coils arranged in series such that an individual heating coil is provided adjacent each cell in the array of cells.

The secondary battery may also include a plurality of battery cells arranged on a first side of a flexible printed circuit board in an array in rows and columns wherein each battery cell includes flexible positive and negative contacts arranged at a top end and bottom end of the battery cell, respectively. The flexible printed circuit board may include a plurality of battery cell connection contact pads arranged on a second side of the printed circuit board opposite the first side. The flexible circuit board further includes a plurality of elongated slots aligned with spaces between the rows of the battery cells in the array. Each elongated slot includes a first contact pad arranged above and towards a first end of the slot and a second contact pad arranged below and towards a second end of the elongated slot. The elongated slot is configured to receive a flexible battery cell contact from two adjacent cells within a column for electrical connection to the first and second contact pads adjacent each slot. The second side of the flexible printed circuit board preferably also includes a plurality of connection contact pads arranged in a first row extending adjacent to a top edge and a second row extending adjacent to a bottom edge. The battery cells may be arranged in a top row and bottom row on the printed circuit board and the cells include flexible contacts that wrap around a top or bottom edge of the flexible printed circuit board for connection to contact pad provided in the first or second row of contact pads. The flexible printed circuit board may also include apertures to assist in folding of the flexible printed circuit board. The battery may further include circuit boards mounted to the flexible printed circuit board. The circuit boards preferably include electronics in the form of hardware and software configured to form a battery controller.

This summary is provided to introduce selection of concepts in a simplified form that are further described below in the Detail Description. This Summary is not intended to identify key features or essential features of the claimed subject matter. A more extensive presentation of features, details, utilities, and advantages of the secondary battery, as defined in the claims, is provided in the following written description of various embodiments of the disclosure and illustrated in the accompanying drawings.

BRIEF DESCRIPTION OF THE DRAWINGS

FIG. 10 illustrates a plurality of battery cells positioned within the housing in a non-flexed state in accordance with at least one embodiment of the present disclosure.

FIG. 11 illustrates the plurality of battery cells in FIG. 10 in a flexed state in accordance with at least one embodiment of the present disclosure.

DETAILED DESCRIPTION

The invention relates to the assembly of battery cells packed into a housing with integrated control electronics to form a rechargeable battery. The battery, for example, includes a plurality of prismatic Lithium-Ion (Li-Ion) cells. The housing is durable, lightweight and flexible to accommodate portability and field use. The control electronics provide increased safety, functionality and reliability. A flexible printed circuit board provides a substrate for carrying the components and providing electrical connections therebetween.

In order to provide both durability and a degree of flexibility, a thermoplastic elastomer, thermoplastic vulcanizates or dynamically vulcanized polymer alloy material is used to house rows of flat prismatic cells. Preferably, the thermoplastic vulcanizates may be selected from cured ethylene propylene diene monomer (EPDM) rubber or EPDM rubber ground into particles and encased in a polypropylene matrix. The housing is configured as a clamshell, with one half including a perimeter groove and the other half including a mating perimeter tongue. While the clamshell can be adequately sealed with adhesive lining the tongue and groove joint, the sealed joint remains flexible. This flexibility may be undesirable in certain locations which are to be equipped with controls, displays, and peripheral connectors. In previous designs, the lower housing was boxed shaped with side walls extending the entire height of the case. A cutout was formed in the lower housing wall to accommodate walls and displays. In these instances, the housing was weakened in the area of the cutout and created the potential for water intrusion. In the disclosed design, the bottom housing carries half of the side wall, and the upper housing carries the other half of the side wall. In this way, a window which receives rigid plastic inserts which house the battery contacts, controls and displays is set symmetrically in both the top and bottom housing.

Figure 1:
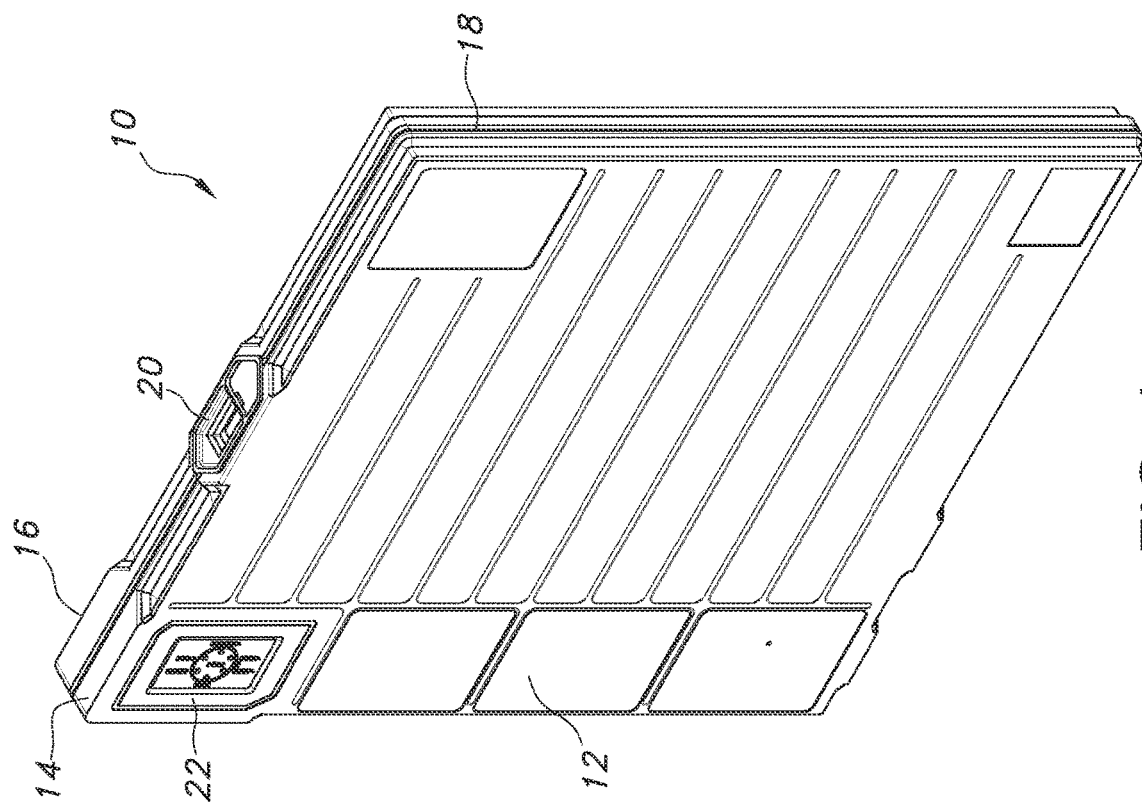
FIG. 1 is a front perspective view of a secondary battery in accordance with at least one embodiment of the present disclosure.

FIG. 1 is a front, top perspective view of a completed battery assembly 10. The battery assembly includes a flexible housing 12 comprising an upper half 14 and lower half 16. The upper and lower half of the housing are joined along the sidewall midsection at the flange 18 which extends around the perimeter of the housing. As noted above, the flange provides an area for a tongue and groove connection between the two housings 14, 16. The tongue can be on either the upper or lower housing with the groove being on the opposite side. As shown in FIG. 1, the battery assembly includes a display 20 and a connector module 22.

Figure 2:
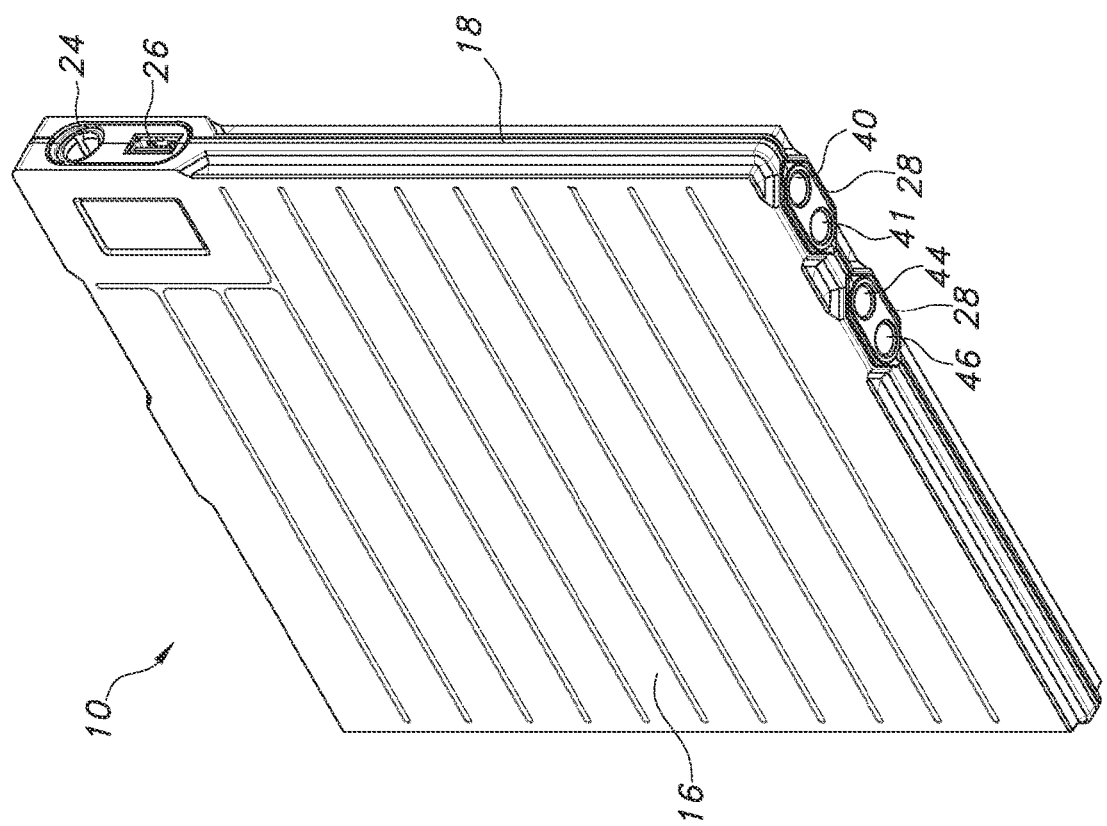
FIG. 2 is a rear perspective view of a secondary battery in accordance with at least one embodiment of the present disclosure.

FIG. 2 is a rear bottom perspective view of the completed battery assembly 10. As shown in FIG. 2, a connector module 22 includes a multi-pin, circular DIN type female connector 24 and a USB connector 26. Also shown in FIG. 2 are two contact carriers 28 located on a bottom edge of the battery assembly. Contacts are mounted within a rigid insert which will be discussed in greater detail below.

Figure 3:
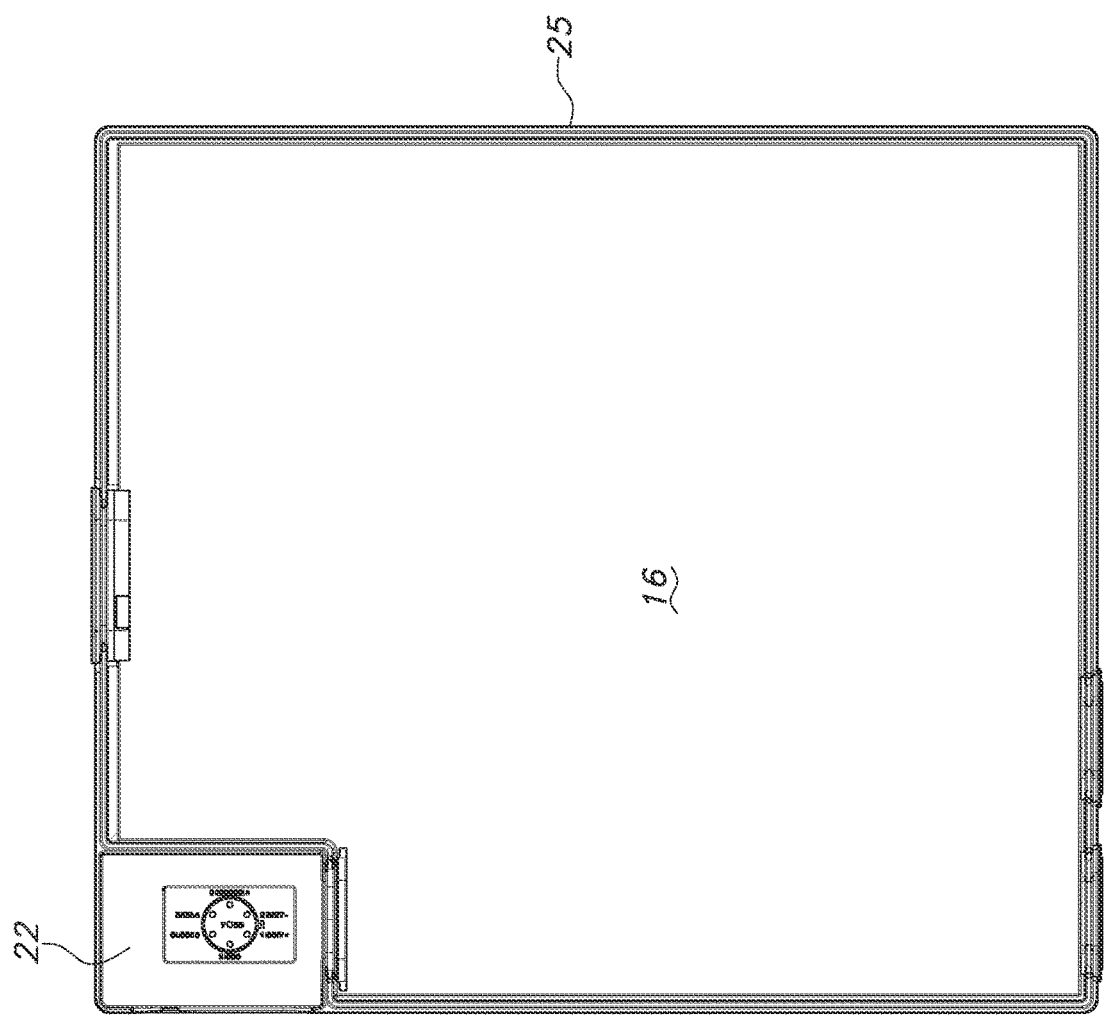
FIG. 3 is a top plan view of a lower half of a secondary battery housing in accordance with at least one embodiment of the present disclosure.

FIG. 3 is a bottom view of the lower housing 16 illustrating the groove 25 extending around the periphery of the housing. It should be noted that the groove extends into the housing along the inner edges of the connector module 22. As will be discussed in detail later, the connector module 22 includes a sealed overmolded housing or body and only a ribbon connector within an insert extends into the interior of the housing for connection to a printed circuit board. Thus, an environmental seal is produced around the internal battery assembly and printed circuit board. As shown in FIG. 3, the rigid contact carriers, display housing insert and connector module ribbon connector insert all include a tongue or flange on one half to sit within the housing groove and a groove on the other half to receive the tongue on the other half of the housing.

Figure 4:
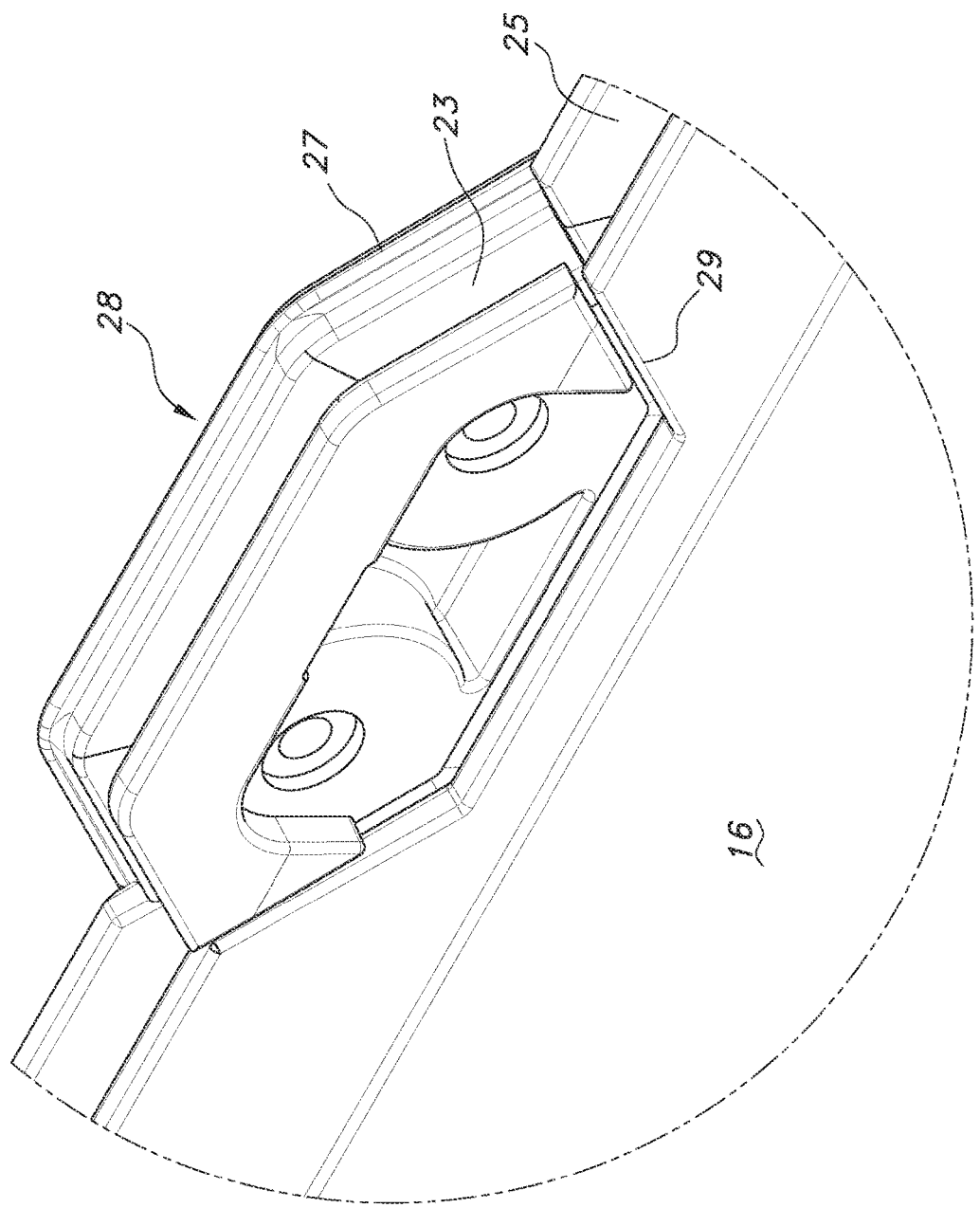
FIG. 4 is an enlarged view of a rigid insert mounted in a lower half housing window having a peripheral groove in accordance with at least one embodiment of the present disclosure.

More specifically, FIG. 4 illustrates an enlarged perspective view of a rigid insert in the form of a contact carrier 28 positioned within a housing window 29 wherein the lower housing 16 includes the peripheral groove 25. The tongue and groove in the housing are set back away from the parting line in those certain locations to create a window 29 which is occupied by a rigid joint insert 27 such as contact carrier 28 or display 20. In one embodiment, the insert is a hexagonal shaped frame, and more specifically an irregular hexagon, or elongated hexagon. The rigid insert 27 includes a tongue received in the housing groove 25 and on the opposite side of the insert 27 includes a groove 23 formed by a pair of spaced apart rails which creates a continuous, co-extensive groove with the housing groove 25 as shown in FIG. 4. Thus, the upper housing tongue fits within the lower housing groove 25 and can be sealed by e.g. use of an adhesive, to securely join the upper and lower housings with the inserts 27 in the windows 29.

Figure 5:
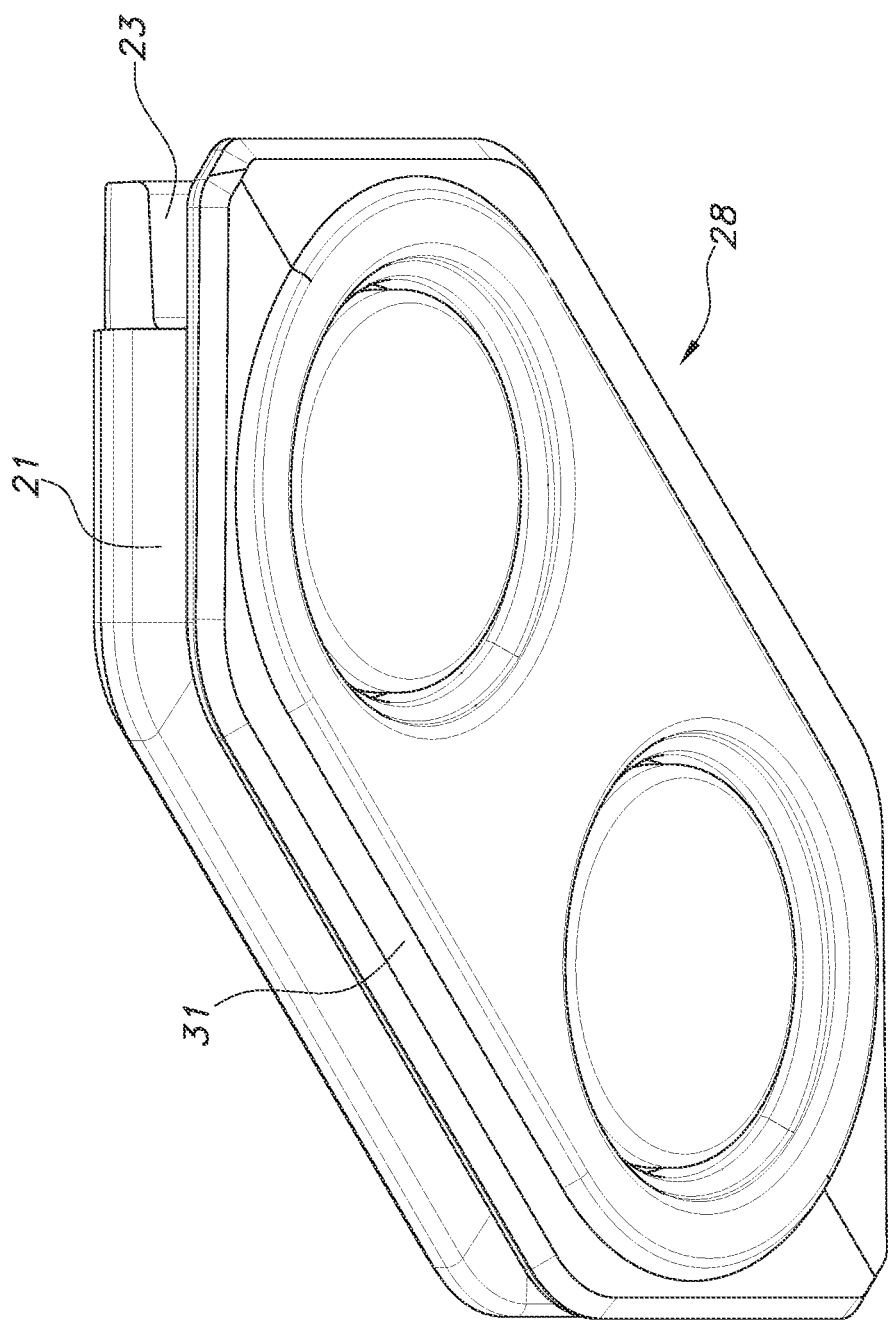
FIG. 5 is a front perspective view of a rigid insert in accordance with at least one embodiment of the present disclosure.

FIG. 5 illustrates a perspective view of a contact carrier 28 showing the elongated hexagonal rigid body 27 or frame having a tongue 21 on one elongated side and a groove 23 on the opposite side. The elongation occurs along the horizontal axis. An elongated hexagon is a regular hexagon where two parallel sides are elongated, so that the frame maintains vertical and horizontal symmetry. Thus, the housing windows and rigid inserts are tapered at their lateral ends where they meet the parting line and have a right or left facing v-shaped configuration.

The bottom three sides of the frame 27 are configured as a tongue 21, while the top three sides form a groove 23. When assembled, the clamshell housing tongue runs within the clamshell housing groove, and in the area of the window 29 runs along the rigid joint insert. Thus, the joint insert tongue fills in the groove in the area of the housing window.

Other shapes and configurations are possible for the joint insert, while maintaining the key features of continuing the tongue/groove across the window and providing a tapered end at the lateral sides of the window. The rigid joint insert 27 which features the tongue and groove on its outside edges, preferably includes an open central area to install controls, displays, peripheral connectors and/or contacts. The joint insert 27 also adds rigidity to the case, especially in the areas of the windows. It provides a stable platform for the controls, displays and peripheral connectors. The joint insert design extending the housing tongue and groove around the windows also maintains the weatherproof seal that is provided by the clamshell housing tongue and groove. The gradual slope of the tapered ends of the joint insert also reduces the downward flow of adhesive when the inserts are glued into the housing clamshell. Since some adhesive flows down under the influence of gravity the joint insert includes an outer panel 31 that is configured to overlap a portion of the lower housing, as shown in FIG. 5.

Figure 6:
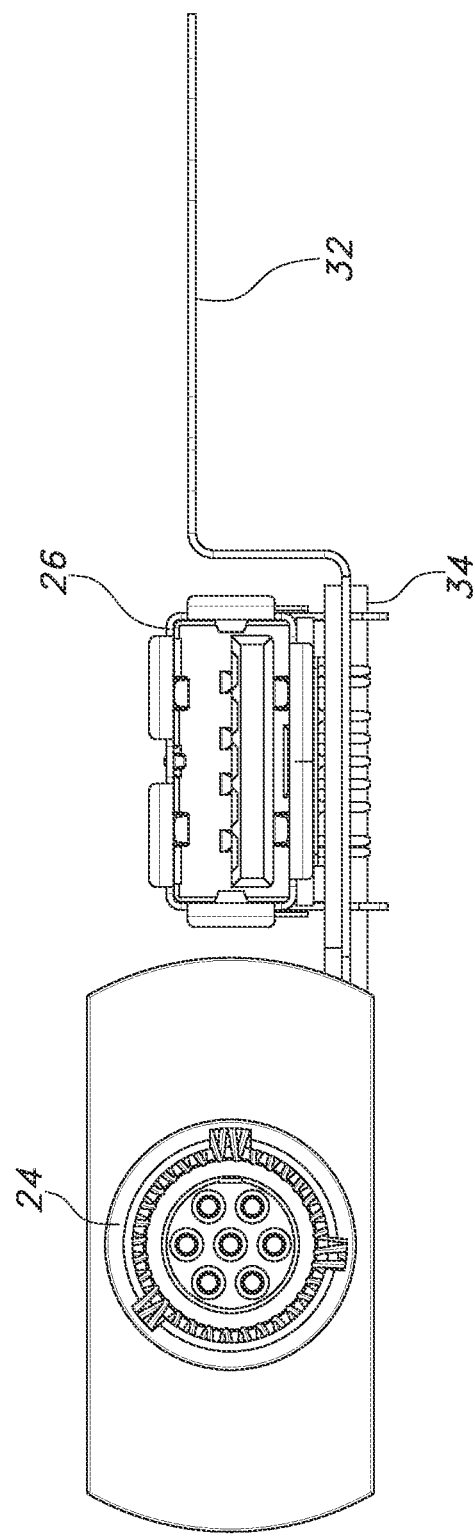
FIG. 6 is a front view of a connector assembly in accordance with at least one embodiment of the present disclosure.

Due to size, spacing, location and connectivity issues, some connectors are not suitable for mounting in a joint insert to be positioned in the clamshell housing. In one embodiment, these type of connectors are disposed outside the periphery of the clamshell tongue and groove seal. As can be appreciated, a multi-pin circular DIN type recessed female connector requires considerably more mounting depth than a 2 mm thick LCD or OLED display. Accordingly, as shown in FIG. 6, connectors such as a USB-A connector 26 and NetWarrior circular connector 24 are soldered onto a flexible printed circuit board (PCB) 34 having a distal connection end 32 for connectivity to a flexible printed circuit board assembly within the battery housing.

Figure 7:
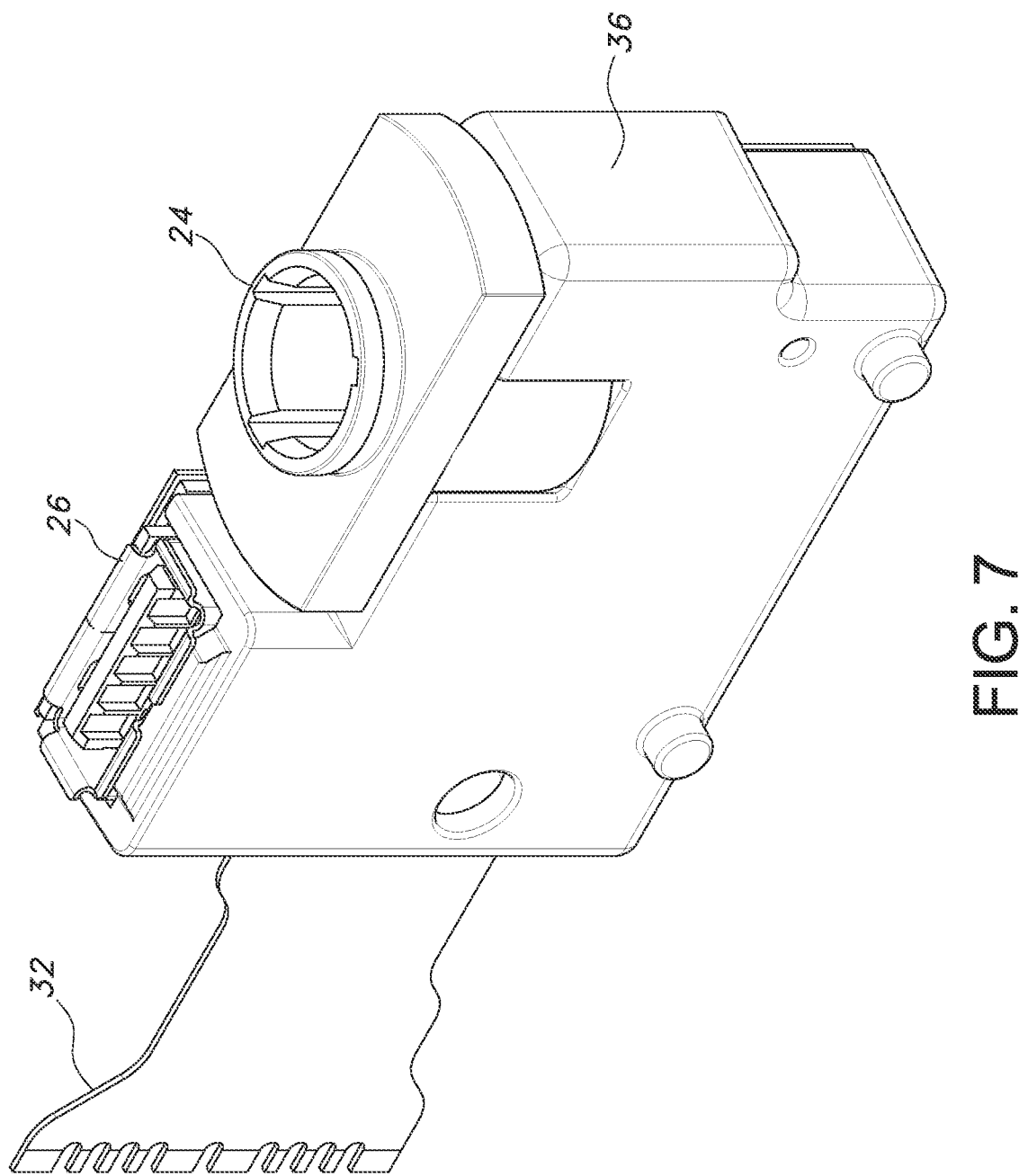
FIG. 7 illustrates the connector assembly shown in FIG. 6 mounted within a case in accordance with at least one embodiment of the present disclosure.

As shown in FIG. 7 the connectors 24, 26 are attached to a PCB 34 and preferably mounted within a plastic carrier 36. The connectors are accessible from one side of the plastic carrier. The plastic carrier 36 is preferably made from a high strength, low weight polymer to house all the components and maintain their positioning relative to the PCB.

Figure 8:
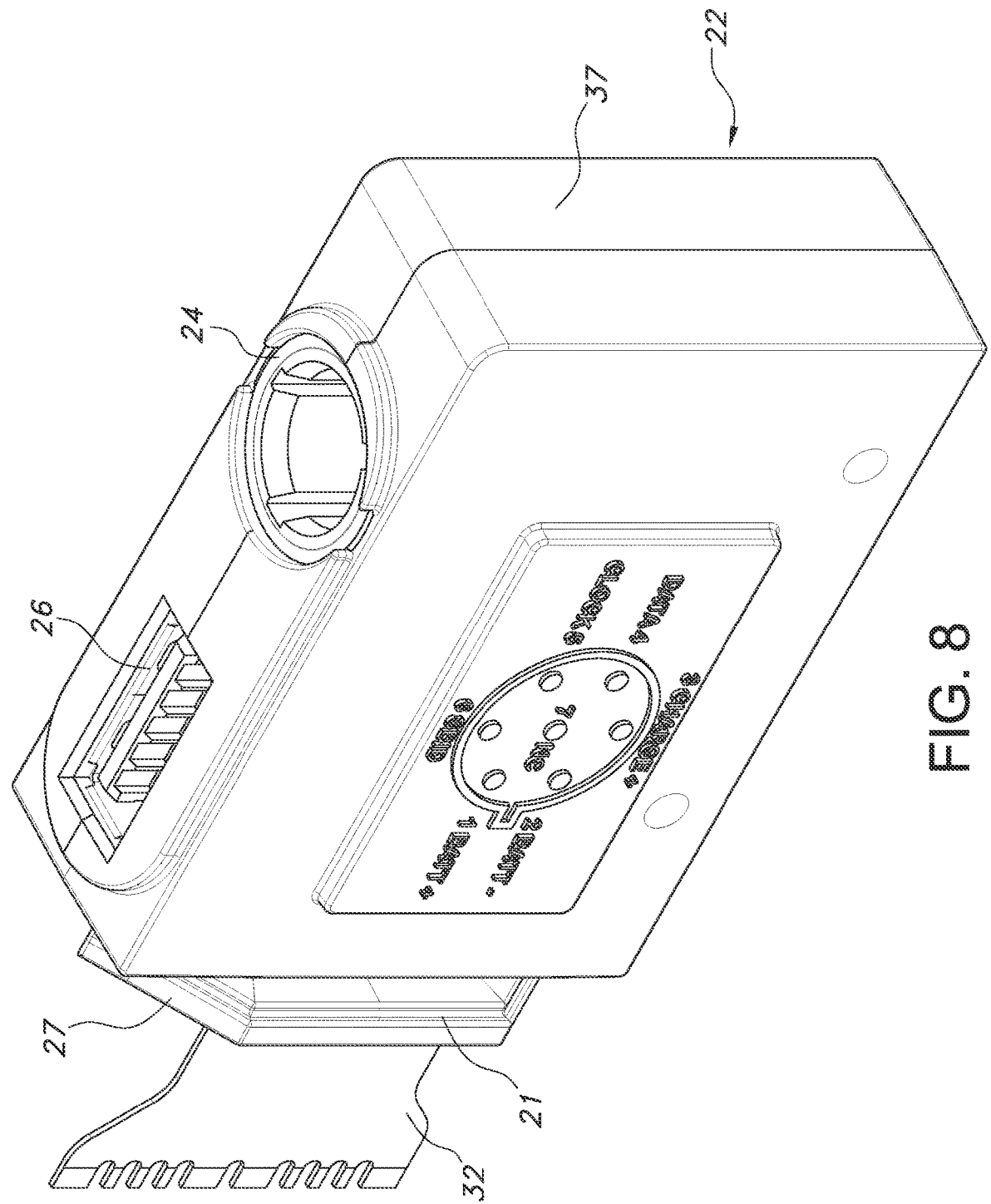
FIG. 8 is a front perspective view of the connector assembly shown in FIG. 7 encapsulated in an overmolded housing in accordance with at least one embodiment of the present disclosure.
Figure 9:
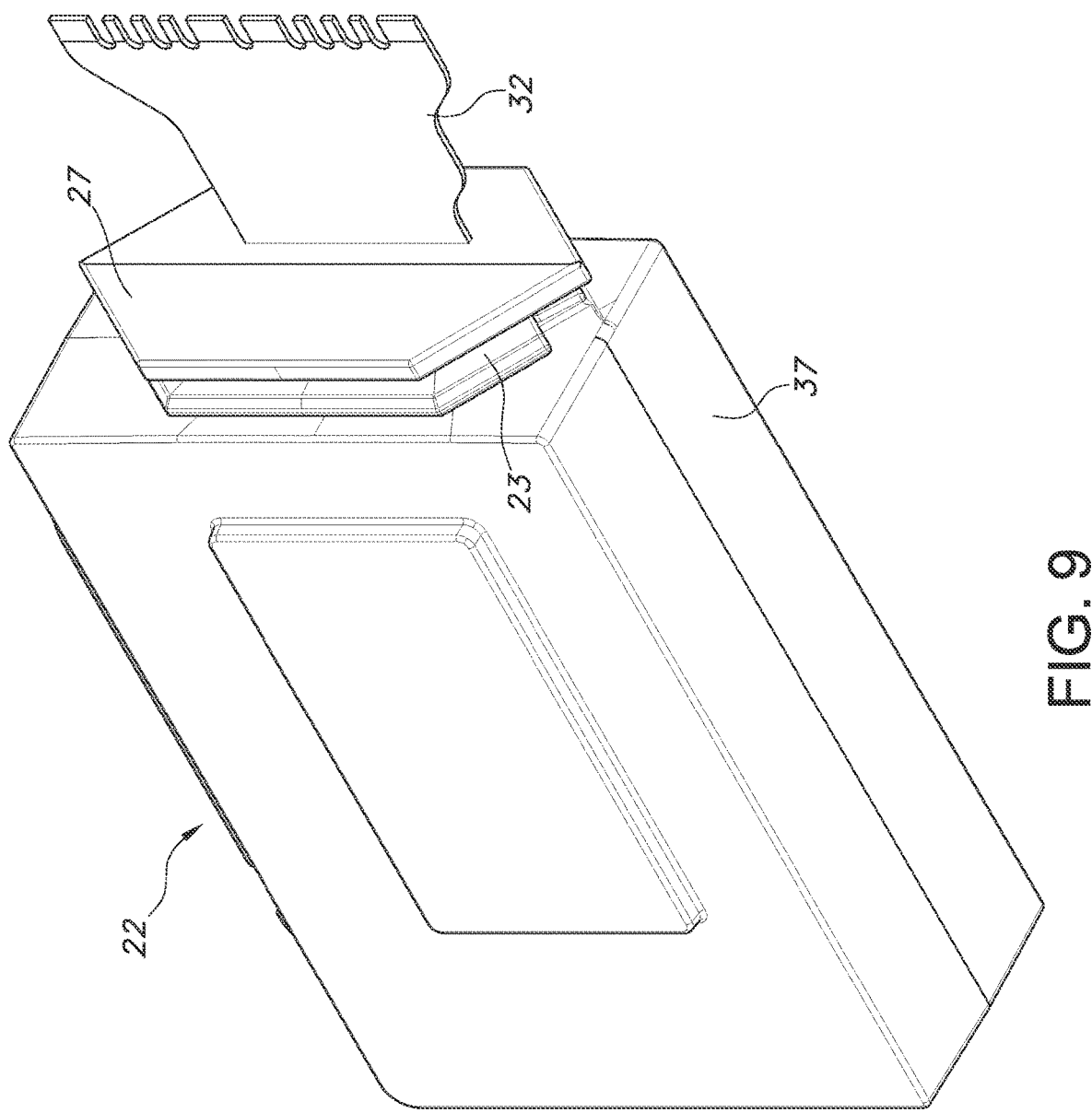
FIG. 9 is a new perspective view of the connector assembly shown in FIG. 8 in accordance with at least one embodiment of the present disclosure.

A portion of the distal connection end of the printed circuit board 32 extends outwardly from the plastic carrier 36. As shown in FIGS. 8 and 9, a durable, flexible material forming a housing or body 37 is then overmolded around the plastic carrier. Preferably, the overmold material may be made from a material similar to that used for the clamshell housing. The overmolded housing 37 encompasses the entire plastic carrier, with apertures for the connector inputs. The overmolded housing further encompasses approximately half the length of the distal connection end of the PCB 32. The overmolded housing 37 seals the plastic carrier, a portion of the PCB 34 and back end of the enclosed connectors to provide environmental protection. As previously noted, the connector module 22 is mounted in a separate compartment within the outer housing and disposed outside of the clamshell tongue and groove. In order to pass the distal connection end of the PCB through the clamshell housing tongue and groove seal, the overmolded housing 37 is provided with an insert 27 including complementary tongue and groove portions surrounding a portion of the distal connection end of the PCB. More specifically, similar to the rigid, elongated hexagonal inserts discussed above, the overmolded housing includes a similarly shaped hexagonal insert 27 having a tongue on one half and a groove on the other half which surrounds a portion of the distal connection end of the PCB and can be mounted in a correspondingly shaped window in the outer housing compartment to extend the connection end of the PCB into the battery housing for connectivity.

As described above, the secondary battery pack may be placed in a backpack, front pack or a pocket in clothing sized to receive the battery. Thermoplastic vulcanizates (TPV) such as Santoprene and similar rubbery materials that may be used to form the clamshell housing can be somewhat rough and tend to have a high coefficient of friction. A rough outer surface can make it difficult to slide the battery pack in and out of a pocket or backpack. To address this issue, the clamshell housing may be treated with a low friction coating. Certain friction reducing coatings like parylene, plastiglide, fluorobond and various PTFE coatings may be used on the exterior surfaces of the clamshell housing. Furthermore, it was discovered that dip-coating or spray-coating the clamshell housings along the tongue and groove, improved the adhesion at the clamshell joint. These coatings also provide a protective layer and prevent the migration of additives such as Santoprene from contaminating the adhesive. Alternatively, the clamshell housing may also include an additive or primer directly in the housing material to reduce surface friction. A portable battery pack for field use may also have certain requirements for the overall dimensions and case material properties. A battery that is worn or carried preferably includes a relatively thin soft touch case.

In one embodiment, flat prismatic cells 40 are mounted to a flexible printed circuit board 42 arranged in rows and columns, for example, in two layers as shown in FIG. 10. By using rows and columns of discrete flat prismatic cells 40 in a rubber or polymer housing and a flexible substrate on which the cells are mounted, the battery pack has a degree of flexibility. This feature adds to the comfort and convenience if the battery pack is worn, for example, placed against the body in a backpack or frontpack. From a flat orientation, each end of the battery pack can be vertically displaced between 0.75 and 1.5 inches under the influence of between 30 and 40 pounds of force.

At the furthest point of displacement the battery pack requires the introduction of flex limiting. As shown in FIGS. 10 and 11, the battery may include two layers of flat prismatic cells 40. Each layer has rows and columns of battery cells that are in registration with the cells of the other layer. When the battery pack is flexed downwardly, the top layer of cells pull away from each other and the bottom layer of cells move toward each other. To avoid contact between cells in the concave layer, strips or blocks of elastomer 44 may be placed between adjacent cells. The elastomer 44 may extend between rows, between columns, or both.

To avoid overextension between cells in the convex layer, a retention band such as industrial grade tape 46 may be adhered to the cells across rows, or columns or both. According to a process for introducing flex limiting, the battery pack is flexed to the displacement limit in the X direction and a retention band, such as industrial or glass filament tape 46 is adhered across the cells. Next, the battery pack is flexed to the displacement limit in the Y direction and the retention band 46 is adhered across the cells. The battery pack is then inverted, and the same two flex and retention band application steps are repeated. Since the retention band 46 cannot be stretched, the bending radius is limited to the length of the retention band as shown in FIG. 11. An alternative flex limiting arrangement may rely on the external clamshell case itself rather than internal tape. Rather than having the individual prismatic cells free floating within the battery housing, some or all of the cells may be adhered to the battery housing. In some instances, a center row or center column of cells remains unglued since there is no bending moment within one row, just between adjacent rows (or columns). Thus, the limitations of the bending of the housing prevents overbending.

As shown in FIG. 2, the battery pack preferably includes at least four contacts: a positive contact 40, a negative contact 41, a clock contact 44 and a data contact 46. The clock and data contacts 44, 46 transfer information between the battery controller and a charging device to confirm compatibility before power is transmitted through the positive and negative contacts to charge the prismatic cells.

For certain applications, it is desirable to place the battery pack in a non-discharge state. Since the positive and negative contacts are exposed and to prevent short circuit of the terminals, discharge is typically disabled to protect the user and nearby equipment. However, a problem arises if the battery pack needs to be shipped or serviced or tested. In general, battery packs of this type should be discharged below a certain level in order to be safely shipped. For example, a safe shipping level may be 20-30% state of charge.

A protocol has been established to safely enable secure discharge. In summary, the battery pack system controller and a compatible charger are both provided with interactive hardware and or software that allows the battery pack to enter a secure discharge state under limited conditions. The battery system controller intermittently monitors for the presence of the charger hardware/software. For example, the battery system controller may check every few seconds to see of the charger hardware/software is still present. If the charger has been disconnected, the battery system controller reverts to the non-discharge state.

In one embodiment, the battery pack controller and the charger hardware/software exchange a secret handshake to enable secure discharge. The battery system controller then checks every few seconds to see of the handshake is still present. If the charger has been disconnected, the battery system controller reverts to the non-discharge state. In a further embodiment, the charger communicates through the clock and data contacts of the system management bus (SMBUS) with the battery pack controller. The charger and controller each have keys embodied in hardware or software components. The keys are processed according to various schemes that may include compared, exchanged, randomized, hashed and/or calculated. If the charger is validated, discharge mode is enabled and the battery cells will discharge via the positive and negative contacts. The battery system controller then checks every few seconds to see if the validation is still present. If the charger has been disconnected, the battery system controller reverts to the non-discharge state. Alternatively, the battery controller can receive authorization to enable discharge via the NetWarrior connector. A device or cable may be provided with a NetWarrior connector on the battery side, and an adapter to an authorized charger with discharge capabilities on the other side.

In a further embodiment directed to discharging the battery, the charger queries the battery to perform a handshake with the battery that allows the battery to validate it is an intelligent and authorized request. Once validated, the request can then turn on the discharge on what are normally charge only contacts. It can also request that the discharge mode is shutoff on command after it has been turned on. In certain scenarios, a cycle test may be performed i.e., the battery is automatically charged, discharged and charged. The charger repeats the request on a periodic basis, e.g. once a minute, as a form of protection. If the battery does not receive the once a minute request, it will shut off the discharge pathway as protection from being used inappropriately or to prevent accidental shorts across the contacts of the battery.

Figure 12:
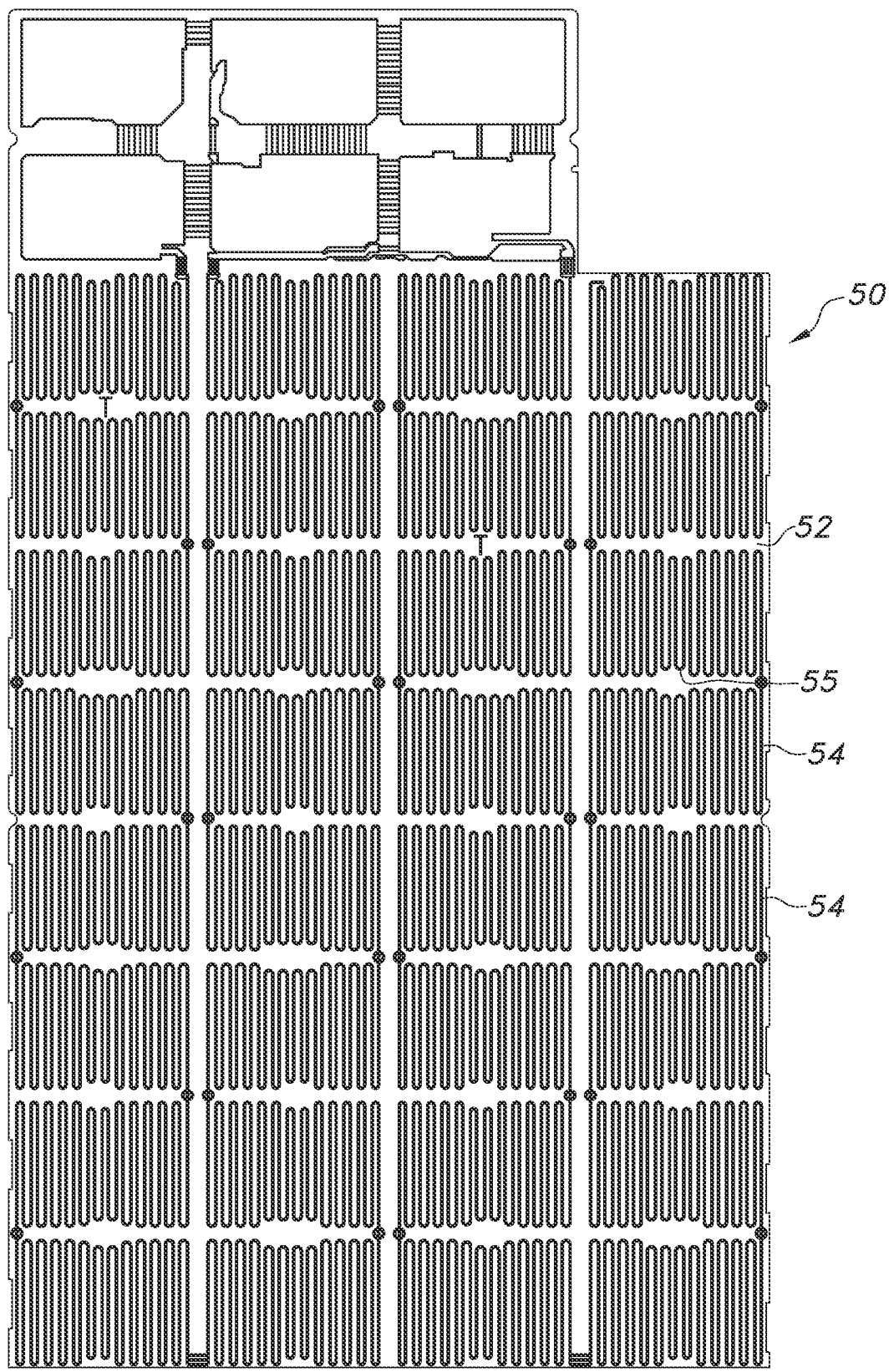
FIG. 12 illustrates a heating element for use with the secondary battery in accordance with at least one embodiment of the present disclosure.

The secondary battery disclosed herein preferably uses a matrix of prismatic cells to achieve desired current and voltage outputs. Typically, prismatic cells charge at reduced rates in colder temperatures. To address this limitation, the battery may include an integrated heater to warm the batteries for rapid charging. Additionally, batteries are subject to penetration from nails, bullets, or other projectiles. Once penetrated, the battery needs to be capable of detecting the penetration, prevent further charging and be taken out of service. This may be accomplished through dual use of the heater element. As shown in FIG. 12, a resistance heating element 50 is printed on the flexible printed circuit board (PCB) 52 that extends throughout the battery pack. The heating element 50 winds back and forth across the PCB in serpentine fashion and adjacent to each prismatic cell, such that each cell has its own heating coil 54. The heating element is designed such that when an object penetrates a cell, the heating element will break, opening the heater circuit of the battery. In addition to the heating circuit, the battery controller is configured to monitor continuity, resistance and/or impedance of the heating element via a detection circuit. When the heating element continuity, resistance and/or impedance is out of range, the battery controller switches to safe mode. The battery remains active and able to provide power to the user until they return from the field. However, charging mode is locked out so that the battery cannot be returned to service. Once damage is detected, the battery controller may provide a visual indication to the user of such damage, e.g. by displaying "000" on the visual display.

Charging of the portable battery may be accomplished, for example, by other battery systems, fuel cells and/or solar panels. When recharging energy is limited in cold environments, the portable battery may be configured to operate in conservation mode, where all energy goes to recharging the cells. Alternatively, when recharging energy is limited, recharging energy may alternately heat the cells via the resistance heating element then switch to battery charging. While this reduces the current draw, the time to fully recharge is extended, for example, up to 10 hours. If recharging energy is not limited, the portable battery may be configured to operate in quick charge mode, where heating and cell charging occur simultaneously. Preferably, the heating may be cycled or moderated to maintain the cells at optimal charge temperature. In quick charge mode, a depleted portable battery may be fully charged in less than 3 hours at −20 degrees Celsius.

The battery system controller continuously monitors various battery conditions. Over long periods of time this monitoring can drain the battery. To preserve battery life, the system controller may be configured to place the battery in an ultra-low quiescent state, or shutdown mode. The system controller may compare battery status to various threshold values. If the system controller encounters inactivity for a period on the order of days, weeks or months, it can switch to shutdown mode. The inactivity threshold may include tracking functions such as charge, discharge and communication. Alternatively, if the battery state of charge or voltage drop below a certain threshold, the system controller may be configured to switch to shutdown mode. Low state of charge or voltage thresholds may be calculated as a certain number of days at a particular charge level. The battery can be woken up by a variety of inputs. Such inputs may include: pressing the display button; connecting an authorized charger; activating a fingerprint contact pad or a series or combination of such inputs. When the proper input is applied, the system controller regulator is turned on to thus allow the system controller to boot the system to turn on.

As noted above, one of the hexagonal frames houses a display 20 including a push button (see FIG. 1). The button may be repeatedly depressed to cycle through the display of various battery states or conditions. As further described above, the overmolded connector body may include a USB port 26. Typically, a USB port is constantly powered or constantly monitored by the host device. In order to preserve battery shelf life, the USB port is configured in the normal state to be unpowered and unmonitored. To activate the USB port, the battery push button is utilized as a secondary function. A user may plug a cell phone or other electronic device into the USB port and depress the battery push button to activate the USB port. Alternatively, the user can depress the battery push button first, and is then provided with a 30-60 second time limit in which to plug in their electronic device. During this activated state, the battery system controller monitors the connected USB device, and once the cell phone or other electronic device is fully charged, the USB port is deactivated, returning to the normal unpowered state.

Figure 13:
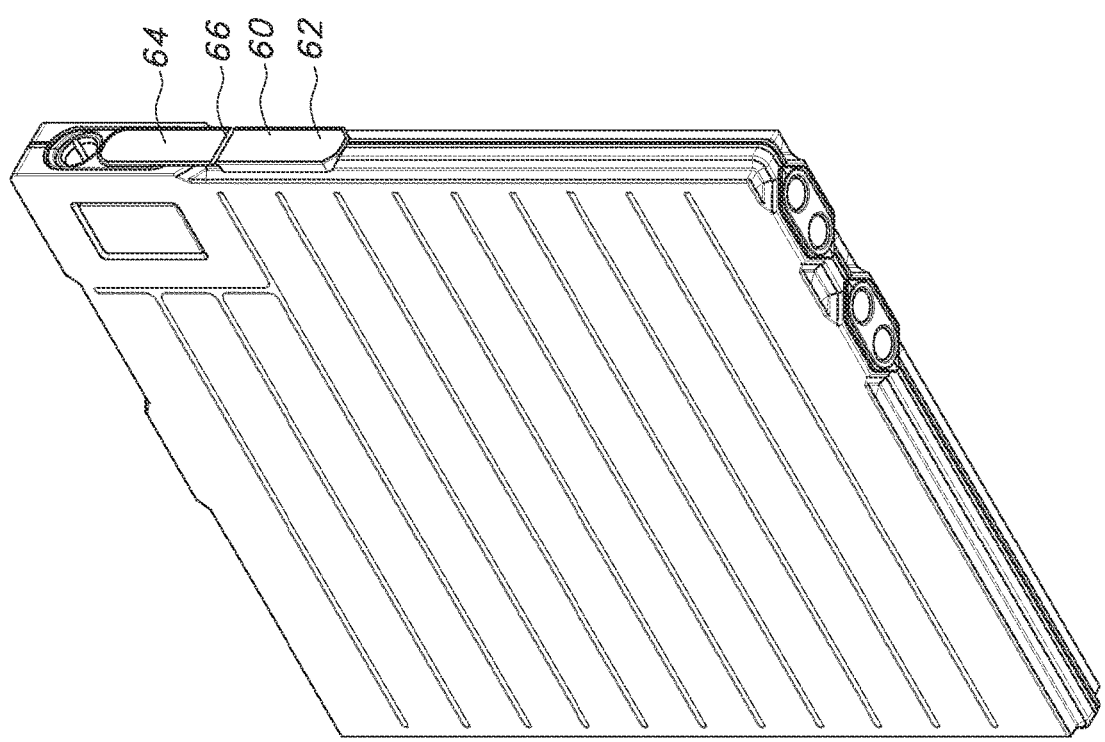
FIG. 13 is a rear perspective view of the secondary battery including a protective cover for a USB connector in accordance with at least one embodiment of the present disclosure.

The USB port includes an open configuration with side-by-side contacts that is subject to corrosion by electrolysis when activated and exposed to salt water. Setting the USB port to a normal state of deactivation, provides a further benefit in that the likelihood of corrosion by electrolysis are greatly reduced. In one embodiment, as shown in FIG. 13, a flexible rubber strip 60 may be provided with one end 62 attached to the housing adjacent the USB port and a second free end of the rubber strip 64 includes a stopper that is configured to be removably inserted into the USB port to provide a degree of protection against dust, dirt, and moisture. The rubber strip 60 may further include a groove 66 to facilitate the bending zone to remove the stopper from the USB port.

Figure 14:
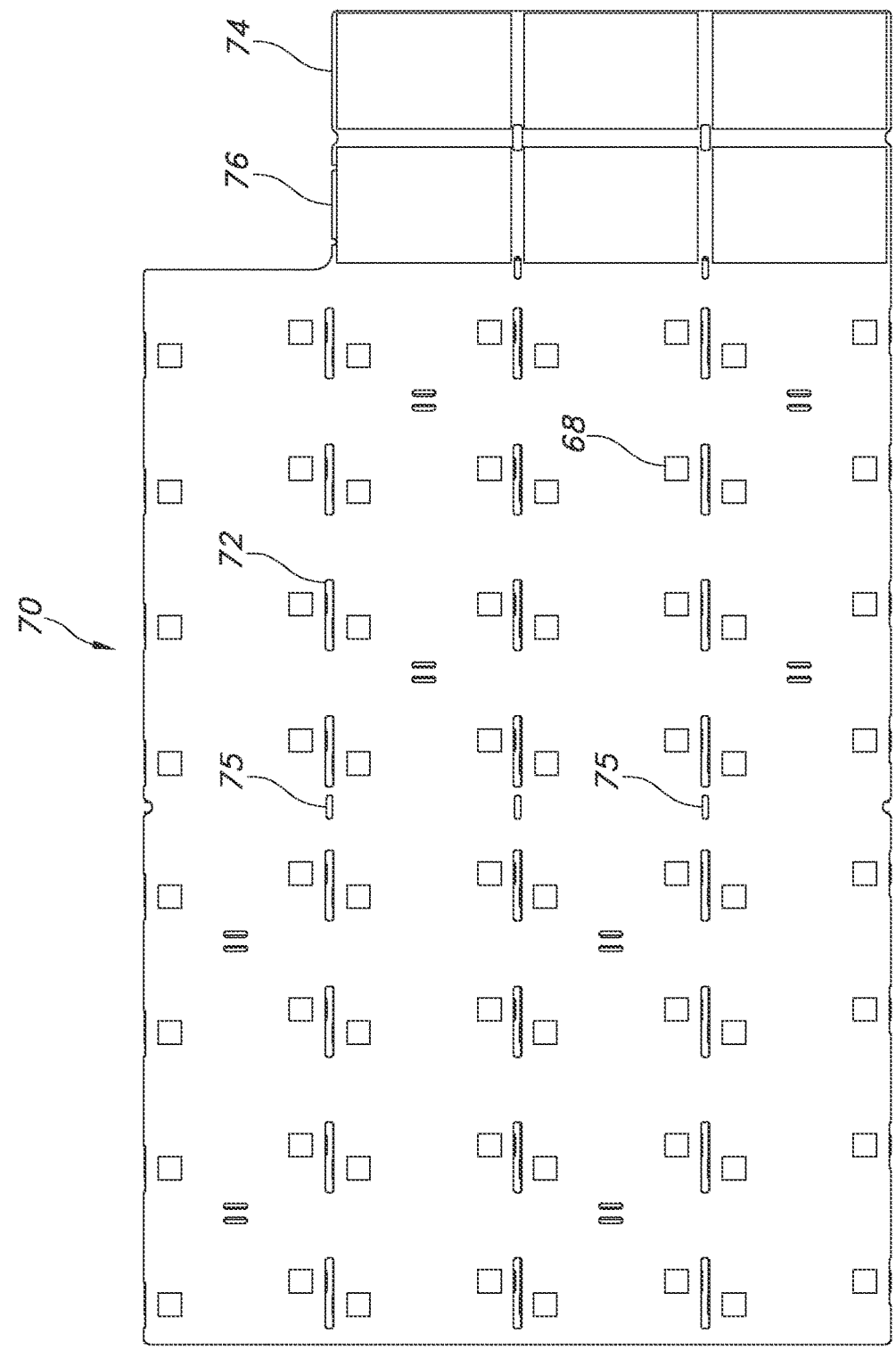
FIG. 14 illustrates a flexible printed circuit board in accordance with at least one embodiment of the present disclosure.

As noted above, the portable battery has a degree of flexibility for user comfort and ruggedness. The substrate which supports and couples the battery cells and control electronics is a printed circuit board (PCB) designed to flex and fold at a desired location. The substrate is preferably an insulating sheet material, for example, a polymide on the order of 15 thousandths thick. As shown in FIG. 14, metallized contacts 68 are printed onto the flexible PCB 70 and the cells, control electronics and other circuit components are then soldered to the contacts. The PCB is preferably stamped with apertures 72 before or after the metallized contacts 68 are printed.

As shown in FIG. 14, one embodiment of a flexible PCB 70 includes two shorter columns 74 and 76 on the right side which support surface mount circuit boards containing the battery control electronics. The remainder of the PCB includes eight longer columns which support the individual cells.

Figure 15:
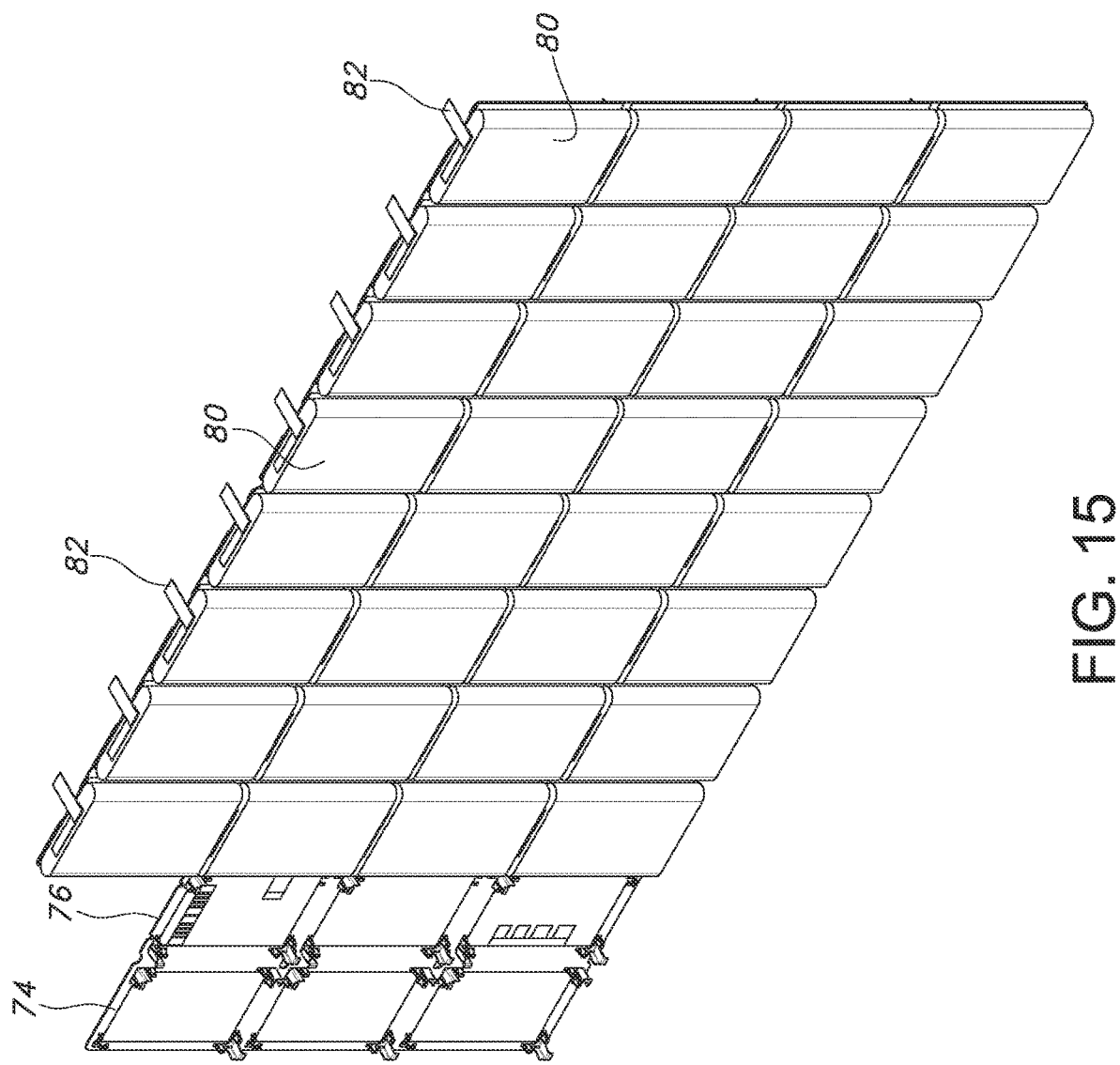
FIG. 15 is a front perspective view of the flexible printed circuit board including a plurality of battery cells positioned thereon in accordance with at least one embodiment of the present disclosure.

The flexible PCB 70 preferably includes metallized printing across the PCB to form the battery circuit path and generally square copper contact pads 68 where the prismatic cell contacts can be soldered. Metallized printed blocks are set out in rows across the columns. Each printed block fits within a row and a column. As shown in FIG. 15, each flat cell 80 includes flat, flexible contacts 82, on opposite ends of the cell. The flat cells are disposed on the opposite side of the flexible printed circuit board from the contact pads 68, with the cell contacts passing through the elongated apertures 72 and folded over onto the pads. The solid metallized printed blocks are supported by the flat cell and are not subject to flexing. In columns 74 and 76, surface mount circuit boards forming the battery controller may be mounted to the PCB. The surface mount circuit boards (CB) are configured to fit within a row and a column. Stiffeners of similar size may be mounted on the opposite side of the substrate overlying the surface mount circuit boards to eliminate flexing in the area of the surface mount circuit boards. The stiffeners are preferably insulating cards, for example, fiberglass cards. Preferably, the PCB is otherwise designed to flex in the X direction, where columns can bend with respect to each other; and flex in the Y direction, where rows can bend with respect to each other.

As previously noted, in cold temperatures the cells take longer to charge, and may require internal heating. A heating element may be disposed between the contact pad and the battery cell. More particularly, a second layer of insulating substrate may be provided to support a heating element in the form of a plurality of heating coils. The two substrates are then bonded together to provide a multi-layer PCB. Some apertures are stamped through one substrate, and after bonding, other apertures are stamped through both substrates.

As shown in FIG. 12, the second substrate layer forming the heating element 50 includes a plurality of serpentine heating coils 54. The heating element is divided into coil sections such that a heating coil 54 is provided under each cell and all coils are connected in series. Each coil section 54 fits within a row and column. Each coil section is supported by a cell so that it is stabilized against flexing. The continuous heating element has a single robust line that extends from one coil section to the next. This robust line is designed to flex and in certain locations fold without incurring damage.

The heating coil sections 54 are generally rectangular and similar in size to a cell. Each heating coil section has several short loops 55 in the middle facing the column break. This gap between the short loops, within the column break, includes vertical slots and a thermistor. The thermistor may be placed on the opposite side of the substrate from the heating element. The placement of the thermistor in the gap bordered by thermistor slots allows an accurate temperature reading within that portion of the housing, without undue influence by the heating coils. Thermistors (T) may be placed in every other column, with a row spacing in between. For example, columns 1-4 may include a thermistor in rows 2 and 4, while columns 5-8 may include a thermistor in rows 1 and 3. Each column break also includes vertical slots extending collinear with the thermistors. The combination of vertical slots and thermistor slots allows flexing of the PCB around the thermistor without adversely effecting its mounting. The vertical slots are formed in the heating element substrate only, before it is laminated to the PCB substrate. Subsequently, the thermistor slots are formed through both substrates. Preferably, insulation bars overlay the vertical slots and prevent the cells from contacting each other during flexing.

Figure 16:
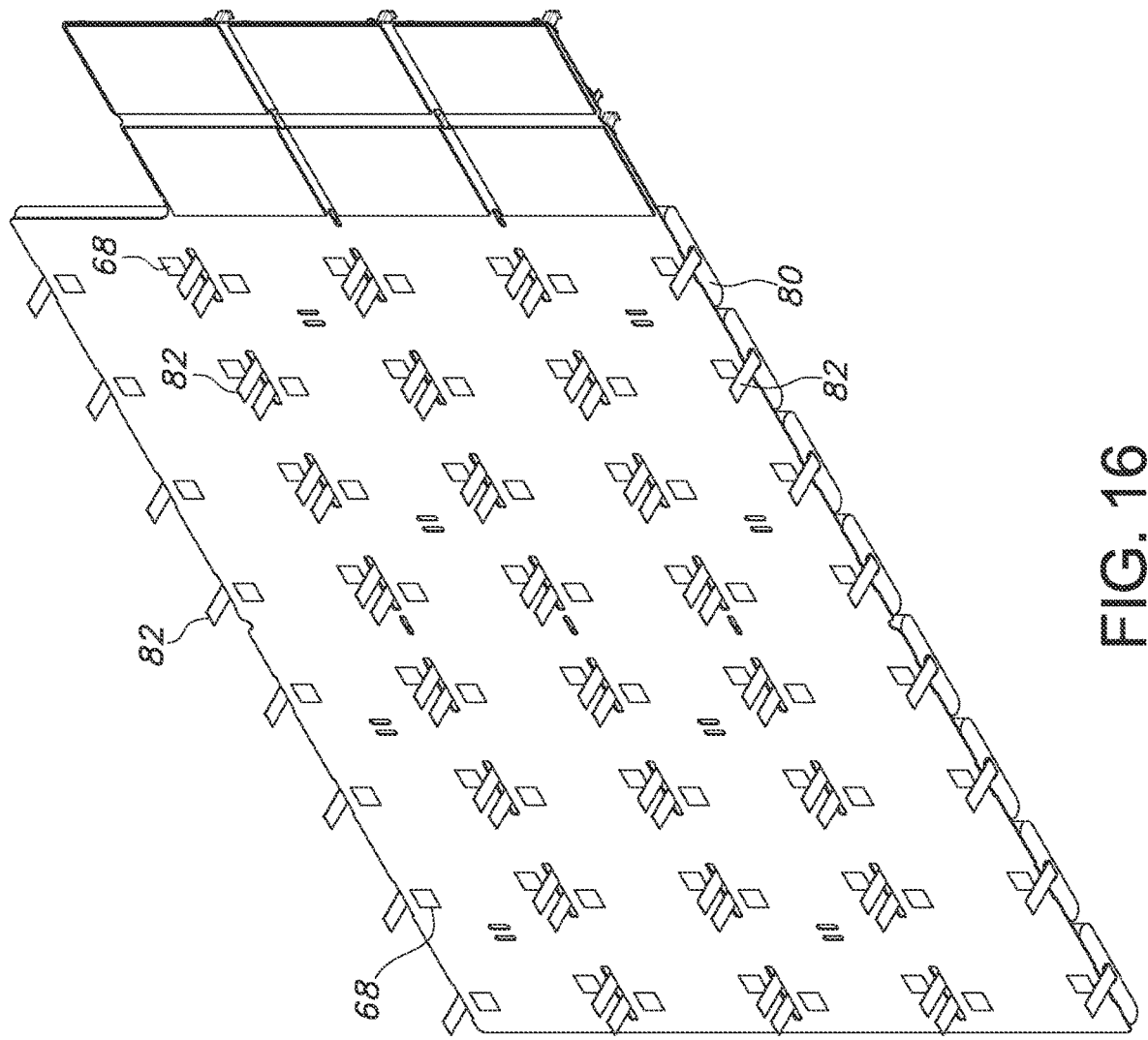
FIG. 16 is a rear perspective view of the flexible printed circuit board illustrating the connection tabs of the plurality of battery cells in accordance with at least one embodiment of the present disclosure.

As shown in FIGS. 14 and 16, in the middle rows of the flexible printed circuit board 70, each pair of square contact pads is separated by a horizontal contact slot 72. The slot may be an elongated oval or racetrack shape. The slots 72 are aligned with the row breaks. The horizontal slot is formed through both substrates and is configured and dimensioned to allow the flat contacts of the prismatic cells from two rows to pass through the substrates. The contacts are preferably bent 90 degrees and soldered to the contact pads 68. By having larger, dual contact slots, the total number of horizontal slots formed in the flexible PCB is reduced by half. The PCB may be folded so that columns 5-8 overlie columns 1-4. An insulator, such as a thin mylar sheet, may be placed between the folded flexible PCB. As shown in FIG. 14, the flexible PCB further includes a series of vertically aligned apertures 75 to assist in folding the PCB. In addition, columns 74 and 76 may be folded to overlie each other.

The embodiment shown includes eight columns each containing four cells for a total of 32 cells. Of course, the number of columns and rows and thereby the cell count, can be increased or decreased depending on factors like weight, size and power requirements. The same form factor can alternatively be configured with 28 higher energy density cells, where the four cells of column 1 would be replaced by four equivalently sized spacer cells to maintain the mechanical integrity of the battery. Placing the spacer cells adjacent the control electronics may reduce the heat generated adjacent columns 74 and 76, and in some instances may serve as a heat sink. The column break between column 76 and the first column of cells may be disposed between insulating stiffeners on a first side, and insulating sheet material on the other side. Below the column break is a gap where columns 74 and the last column of cells on left meet upon the dual folding step. Above the column break is an optional column of spacer cells.

The horizontal slots 72 are positioned so that the slots in columns 1-4 overlap the slots in columns 5-8 by approximately 50 percent. The contact pads 68 are selectively positioned adjacent and spaced from the horizontal contact slot 72. The contacts are likewise lengthened to reach the spaced contact pads. This allows upper solder joints between the cell contacts and the PCB pads to be offset from those on the lower layer, reducing the possibility of having the solder joints contact each other during rough handling of the battery pack, and also allows the folded layers to be closer together. For example, the contact pads 68 on one layer are shifted horizontally along the horizontal contact slot to avoid interference with the corresponding contact pads when folded. Additionally, the contact pads on one layer are shifted laterally away from the horizontal contact slot to avoid interference with the corresponding contact pads when folded.

The clamshell housing is preferably a regular rectangle. The folded PCB has one free space at the top of columns 74 and 76, referred to as the free corner. While the housing extends convexly over the two outer sides of the free corner, the tongue and groove joint routes around the two inner sides of the free corner. The overmolded connector body 37 described above is disposed within the free space, outside of the tongue and groove joint. The overmolded connector body 37 is designed to be weatherproof. The overmold connector body is provided with a rigid insert including complementary tongue and groove portions surrounding the ribbon cable which interface with the tongue and groove of the clamshell housing at the top of the shortened columns 74 and 76. The ribbon cable which is now inside the housing seal, is connected to one of the surface mount circuit boards in column 74 or 76.

The logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal and distal are only used for identification purposes to aid the reader's understanding of the claimed subject matter, and do not create limitations. Connection references, e.g., attached, coupled, connected and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

The invention claimed is:

1. A housing for a secondary battery comprising:
    a flexible housing including an upper half and a lower half wherein one half includes a tongue and the other half includes a groove extending around a periphery of the housing, wherein the tongue and groove include at least one window provided along a joining line;
    a rigid insert including a tongue on one half of a periphery of the insert and a groove on the other half of the periphery of the insert, wherein the insert is configured to mount in the window, wherein the tongue on the insert mounts in the groove of housing and the groove of the insert is configured to be co-extensive with the housing groove and adapted to receive the tongue on the housing; and
    at least one externally accessible connector positioned in the housing, the connector being mounted to a printed circuit board including a distal connection end, wherein a back end of the connector, the printed circuit board and a portion of the distal connection end of the printed circuit board are disposed in a case, and further wherein the case is encapsulated in an overmolded body to create a weatherproof sealed environment.

2. The housing for a secondary battery according to claim 1, wherein the overmolded body extends over a portion of the distal connection end of the printed circuit board and includes a rigid insert having a tongue and groove configured to be mounted in the housing tongue and groove window to maintain a weatherproof seal.

3. The housing according to claim 1, wherein the at least one externally accessible connector comprises a multi-pin DIN type connector or a USB connector.

4. A housing for a secondary battery according to claim 1, wherein the upper and lower half of the housing and the at least one insert are secured together along the joining line by an adhesive.

5. A housing for the secondary battery according to claim 1, wherein the rigid insert is adapted to mount controls, displays, electrical contacts and peripheral connectors thereon.

6. A housing for a secondary battery according to claim 1, wherein the rigid insert comprises an elongated hexagonal shape such that elongated top and bottom sides are coupled to tapered v-shaped ends and wherein the window is configured to receive the elongated hexagonal-shaped rigid insert.

7. A housing for a secondary battery according to claim 1, wherein the housing is made by injection molding a thermoplastic elastomer and the housing includes an array of flat rectangular battery cells mounted on a flexible printed circuit board positioned within the housing.

8. The housing according to claim 1, wherein the flexible housing includes a friction reducing coating, and further wherein the friction reducing coating is one of parylene, plastiglide, fluorobond and a PTFE coating.

9. A housing for a secondary battery according to claim 1, wherein the housing is configured to mount therein a planar array of spaced block-shaped cells arranged in a plurality of rows and columns on a flexible printed circuit board;
    a first retention band secured to at least two cells across at least one row, wherein the first retention band is provided with a slack portion between the cell rows;
    a second retention band secured to at least two cells across at least one column, wherein the second retention band is provided with a slack portion between the cell columns; and
    wherein the flexible printed circuit board allows each row and column to pivot relative to an adjacent row or column out of a substantially flat plane until the slack portion tightens to limit further movement.

10. A housing for a secondary battery according to claim 9, wherein the retention band comprises tape, reinforced tape, glass filament tape or a non-stretchable thermoplastic.

11. A housing for a secondary battery according to claim 1,
    wherein the housing is configured to mount therein an array of spaced-apart block-like cells arranged in a plurality of rows and columns on a flexible printed circuit board, the array of cells mounted within a flexible housing including externally accessible charging contacts, wherein the charging contacts include power and data contacts;
    a battery charger configured to be removably connected to the power and data contacts to charge or discharge the array of cells wherein the battery charger is configured to query the data contacts and execute a software program to confirm charger authorization to enable charging or discharging the secondary battery through the power contact to the charger; and
    wherein the battery disables discharging if the battery charger is disconnected from the data contacts.

12. A housing for a secondary battery according to claim 11, wherein the battery charger and secondary battery include hardware and software, wherein the charger executes a software program to confirm hardware compatibility to enable discharging the secondary battery through the power contacts to the charger.

13. A housing for a secondary battery according to claim 1, wherein the housing is configured to mount therein an array of spaced apart block-like cells arranged in a plurality of rows and columns on a flexible printed circuit board, the array of cells mounted within a flexible housing, wherein the flexible printed circuit includes a heating element coupled thereto, wherein the heating element is configured to heat the array of cells to enhance charging at low temperatures and further wherein the heating element comprises a resistance wire or trace;

the secondary battery further including a controller comprising hardware and software configured to monitor the integrity of the heating element and execute a software program to disable charging if the heating element exhibits a change in electrical characteristics.

14. A housing for a secondary battery according to claim 13, wherein the change in electrical characteristics is one of continuity, resistance and impedance.

15. A housing for a secondary battery according to claim 13, wherein the heating element is configured as a plurality of serpentine heating coils arranged in a series such that an individual heating coil is provided adjacent each cell in the array of cells.

16. A housing for a secondary battery according to claim 1, wherein the housing is configured to mount therein a plurality of battery cells arranged on a first side of a flexible printed circuit board in an array in rows and columns wherein each battery cell includes flexible positive and negative contact arranged at a top end and bottom end of the battery cell, respectively, the flexible printed circuit board comprising a plurality of battery cell connection contact pads arranged on second side of the printed circuit board opposite the first side, the flexible circuit board further including a plurality of elongated slots aligned with spaces between the rows of the battery cells in the array, wherein each elongated slot includes a first contact pad arranged above and towards a first end of the slot and a second contact pad arranged below and towards a second end of the elongated slot, the elongated slot configured to receive a flexible battery cell contact from two adjacent cells within a column for electrical connection to the first and second contact pads adjacent each slot.

17. A housing for a secondary battery according to claim 16, wherein the second side of flexible printed circuit board further includes a plurality of connection contact pads arranged in a first row extending adjacent to a top edge and a second row extending adjacent to a bottom edge, and further wherein the battery cells arranged in a top row and bottom row on the printed circuit board include flexible contacts that wrap around a top or bottom edge of the flexible printed circuit board for connection to contact pad provided in the first or second row of contact pads.

18. A housing for a secondary battery according to claim 16, wherein the flexible printed circuit board includes apertures to assist in folding of the flexible printed circuit board.

19. A housing for a secondary battery according to claim 16, further comprising circuit boards mounted to the flexible printed circuit board, the circuit boards including electronics in the form of hardware and software configured to form a battery controller.

* * * * *